US012497595B2

United States Patent
Athianrayanan et al.

(10) Patent No.: US 12,497,595 B2
(45) Date of Patent: Dec. 16, 2025

(54) METHOD OF PREPARING A THREE-DIMENSIONAL SCAFFOLD FOR CELL CULTURE

(71) Applicant: KING SAUD UNIVERSITY, Riyadh (SA)

(72) Inventors: Jegan A. Athianrayanan, Riyadh (SA); Vaiyapuri Subbarayan Periasamy, Riyadh (SA); Ali Abdullah Alshatwi, Riyadh (SA); Khalid S. Al-Numair, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 10 days.

(21) Appl. No.: 18/584,039

(22) Filed: Feb. 22, 2024

(65) Prior Publication Data
US 2025/0270508 A1    Aug. 28, 2025

(51) Int. Cl.
*C12N 5/00* (2006.01)
*C12N 5/0775* (2010.01)

(52) U.S. Cl.
CPC ......... *C12N 5/0662* (2013.01); *C12N 5/0062* (2013.01); *C12N 2513/00* (2013.01); *C12N 2533/90* (2013.01)

(58) Field of Classification Search
None
See application file for complete search history.

(56) References Cited

U.S. PATENT DOCUMENTS

2017/0029773 A1*  2/2017  Cho .................... C12N 5/0621

FOREIGN PATENT DOCUMENTS

CN    113846045 A    12/2021

OTHER PUBLICATIONS

Lin et al., "A New Fish Scale-derived Scaffold for Corneal Regeneration," Nanomaterials and Nanotechnology, European Cells and Materials vol. 19, 2010, pp. 50-57. (Year: 2010).*
Iwamoto et al., Sci. Rep. 2022, 12, 4299, pp. 1-10 (Year: 2022).*
Lin et al., Adv. Sci. 2022, 9, 2201226, pp. 1-9 (Year: 2022).*
Yunoki et al., International Journal of Biological Macromolecules 203 (2022) 361-368 (Year: 2022).*
Chen et al., Polymers, 2022, 14, 2532, 17 pages (Year: 2022).*
Wu et al., "Construction and characterization of degradable fish scales for enhancing cellular adhesion and potential using as tissue engineering scaffolds" Materials and Science Engineering: C, vol. 122, Mar. 2021, 111919.

* cited by examiner

*Primary Examiner* — Evelyn Y Pyla
(74) *Attorney, Agent, or Firm* — Nath, Goldberg & Meyer; Joshua B. Goldberg

(57) ABSTRACT

A method of preparing a three-dimensional scaffold comprises obtaining fish scales including a plurality of microgrooves and ridges having a width ranging from about 25 μM to about 30 μM and sterilizing the fish scales to provide the three-dimensional scaffold. The three-dimensional scaffold can be used for in vitro cell growth.

6 Claims, 7 Drawing Sheets

METHOD OF PREPARING A THREE-DIMENSIONAL SCAFFOLD FOR CELL CULTURE

BACKGROUND

1. Field

The disclosure of the present patent application relates to a method of preparing a three-dimensional scaffold for cell culture and, in particular, a method of preparing a three-dimensional scaffold derived from fish scale for cell culture.

2. Description of the Related Art

Tissue engineering involves developing bioartificial tissues and organs through in vitro or in vivo approaches using cells and a scaffold. Engineered bioartificial tissues have been exploited for non-therapeutic and therapeutic applications. Non-therapeutic applications include cell-cultured meat, engineered leather, and biological sensors for contamination. Therapeutic applications include drug discovery and regenerative medicine.

Although in vitro studies generally use two-dimensional (2-D) monolayer cell culture, the 2-D cell culture has some limitations. The 2-D cell culture can alter cellular morphological features and modify the cell-specific extracellular matrix during passage via disturbance of cell-cell and cell-extracellular matrix communications.

Three-dimensional (3-D) cell culture can overcome 2-D cell culture limitations. In the 3-D cell culture, cells grow on 3-D scaffolds, which allows cell-cell and cell-extracellular matrix communications. Three-dimensional cell culture can provide three-dimensional growth conditions for cells, which are closer to the growth environment of cells. Moreover, the three-dimensional cell culture permits cells and tissues to obtain balanced nutrients and facilitates gas exchange and discharge of waste.

Scaffolds are one of the most used methods to achieve three-dimensional cell culture, providing support for cell adhesion, migration, proliferation, and differentiation. In vitro three-dimensional cell culture scaffolds should ideally have the following characteristics: (1) good biocompatibility with cells; (2) highly porous structure, which is conducive to cell attachment, penetration and diffusion, as well as the exchange of nutrients and metabolites; 3) suitable mechanical strength; and (4) biodegradability.

In the past, several kinds of synthetic (polyethylene glycol, poly (glycolic acid), poly (methyl methacrylate), poly lactic-co-glycolic acid and polystyrene) and biomaterials (collagen, fibrinogen, silk, biosilica, gelatin, alginate and hyaluronic acid) were used as a scaffold. These man-made scaffold fabrication methodologies, however, have some disadvantages, including toxic solvent usage and complex protocol.

Fish waste is an inevitable byproduct in fish industries and markets due to the huge production of fish and its food products. Different kinds of fish waste have been generated, including heads, viscera, skins, bone frames, fins, tails and scales (Harikrishna et al., 2017). Fish scales are an inevitable and uneatable product of fish industries. Around 2% of fish body weight is covered by fish scale. Thus, a huge amount of fish scale waste has been generated worldwide due to fish processing and marketing. Fish wastes generate high BOD (biological oxygen demand) and COD (chemical oxygen demands) when discarded into the water streams. Thus, fish waste management is a main environmental concern globally. Fish waste causes environmental pollution due to lack of proper usage and/or application. Curiously, fish scales are mainly composed of inorganic (hydroxyapatite) and organic (proteins, collagen and lipids) material.

Collagen is an important structural protein in an extra-cellular matrix. Earlier studies suggested that the fish scale surface has radiating grooves and ring ridges. Based on surface microstructural features, fish scale is classified into five basic types, including ganoid, ctenoid, cycloid, cosmoid, and placoid.

Thus, new three-dimensional cell culture scaffolds solving the afore-mentioned problems are desired.

SUMMARY

The present subject matter relates to a method of preparing a three-dimensional scaffold, comprising obtaining fish scales including a plurality of microgrooves and ridges, and sterilizing the fish scales. In an embodiment, the plurality of microgrooves and ridges have a width ranging from about 25 µM to about 30 µM. In an embodiment, the fish scales can be sterilized under UV light and/or at a temperature ranging from about 120° C. to 140° C. for about 10 minutes to about 15 minutes under pressurized conditions. In an embodiment, the fish scales can include at least one of *Nemipterus japonicas* (NJS) and *Lates calcarifer* (LCR) fish scales.

According to an embodiment, a method for in vitro cell growth can include providing fish scales including a plurality of microgrooves and ridges, sterilizing the fish scales, equilibrating the sterilized fish scales with cell culture media; and seeding cells in the cell culture media. In an embodiment, the plurality of microgrooves and ridges have a width ranging from about 25 µM to about 30 µM. In an embodiment, the fish scales can include at least one of *Nemipterus japonicas* (NJS) and *Lates calcarifer* (LCR) fish scales.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It will be understood by those skilled in the art with respect to any chemical group containing one or more substituents that such groups are not intended to introduce any substitution or substitution patterns that are sterically impractical and/or physically non-feasible.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

As described herein, "room temperature" means a temperature of about 25° C.

The present subject matter relates to a method of preparing a three-dimensional scaffold, comprising obtaining fish scales including a plurality of microgrooves and ridges, the plurality of microgrooves and ridges having a width ranging from about 25 µM to about 30 µM, and sterilizing the fish scales. In an embodiment, the fish scales can be sterilized under UV light and/or at a temperature ranging from about 120° C. to about 140° C. for about 10 minutes to about 15 minutes under pressurized conditions. In an embodiment, the fish scales are sterilized at a temperature of about 120° C. for about 15 minutes.

In an embodiment, the fish scales comprise at least one of *Nemipterus japonicas* (NJS) and *Lates calcarifer* (LCR) fish scales. In an embodiment, the fish scales are obtained from waste or discarded fish parts.

Fish scales are an inevitable byproduct from fish markets and fish processing industries. Large quantities of fish scale are underutilized. Therefore, fish scales are generally discarded without any usage, causing an environmental nuisance and loss of valuable fish byproducts. Fish scales are mainly composed of collagen I, hydroxyapatite, and calcium carbonate. Fish scale surface morphology of *Nemipterus japonicas* (NJS) and *Lates calcarifer* (LCR) fish was assessed using bright-field microscope and scanning electron microscope, as described herein. It was determined that the fish scales have microgrooves and ridges in the micrometer scale. For example, the microgrooves and ridges range from about 25 µM-30 µM. Further, the fish scales have a disc-like structure which is highly suitable for mammalian and animal cell growth on a solid support matrix in bioreactors. The fish scales were non-toxic and biocompatible material and demonstrated enhanced cell adhesion and proliferation over the surface. Thus, *Nemipterus japonicas* (NJS) and *Lates calcarifer* (LCR) fish scale can be a suitable extracellular matrix for large scale production of stem cells, vaccine production and tissue engineering applications.

According to an embodiment, a method for in vitro cell growth can include providing fish scales including a plurality of microgrooves and ridges, sterilizing the fish scales, equilibrating the sterilized fish scales with cell culture media; and seeding cells in the cell culture media. In an embodiment, the plurality of microgrooves and ridges have a width ranging from about 25 µM to about 30 µM. In an embodiment, the fish scales can include at least one of *Nemipterus japonicas* (NJS) and *Lates calcarifer* (LCR) fish scales. In an embodiment, the fish scales can be sterilized under UV light and/or at a temperature ranging from about 120° C. to about 140° C. for about 10 minutes to about 15 minutes under pressurized conditions. In an embodiment, the fish scales are sterilized at a temperature of about 120° C. for about 15 minutes. In an embodiment, the cell culture media comprises Dulbecco's Modified Eagle Medium (DMEM). In an embodiment, the cells include human mesenchymal stem cells (HMSC).

The present teachings are illustrated by the following examples.

EXAMPLES

Example 1

Fish Scales

*Nemipterus japonicus* and *Lates calcarifer* fish scales were collected from a local fish market in Riyadh, Kingdom of Saudi Arabia. The collected fish scales were washed with tap water to remove unwanted contaminants and debris. The surface morphological features and chemical composition of the cleaned fish scales were investigated using Scanning electron microscope (SEM) and Energy-dispersive X-ray spectroscopy (EDS). The functional groups of the fish scales were analyzed using Fourier transform-infrared spectroscopy (FTIR).

Figure 1A:
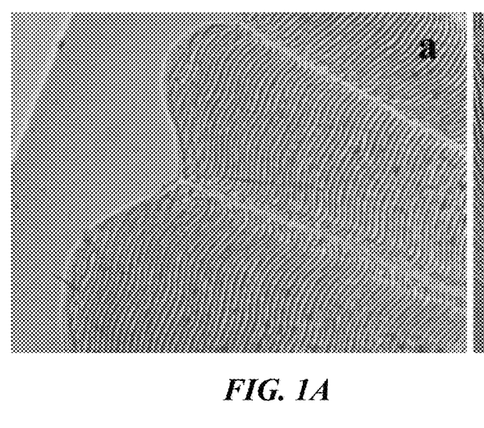
FIGS. 1A-1D are microscopic images of different areas of *Nemipterus japonicas* fish scales.
Figure 1B:
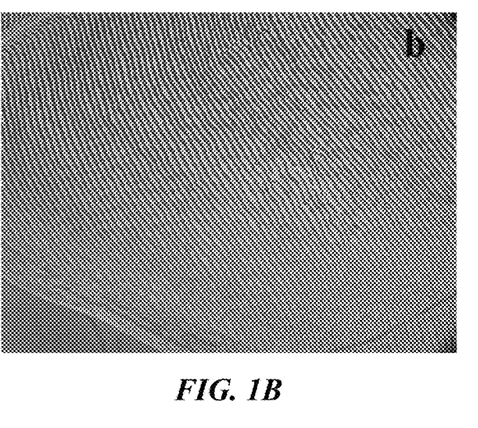
Figure 1C:
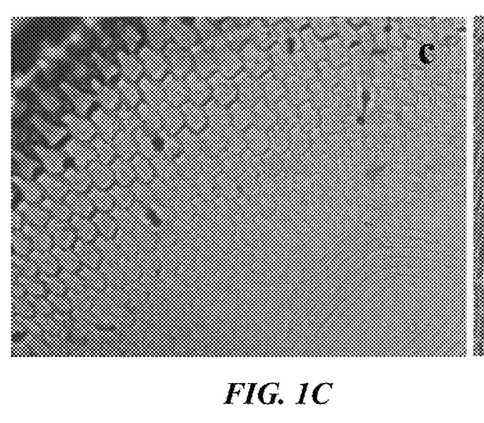
Figure 1D:
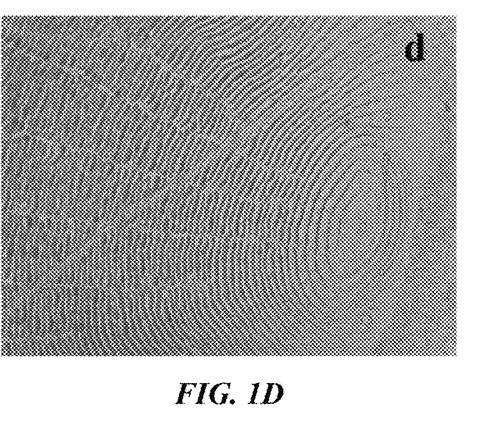
Figure 2A:
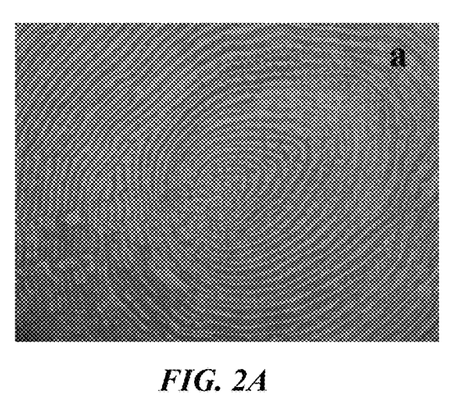
FIGS. 2A-2D are microscopic images of different areas of *Lates calcarifer* fish.
Figure 2B:
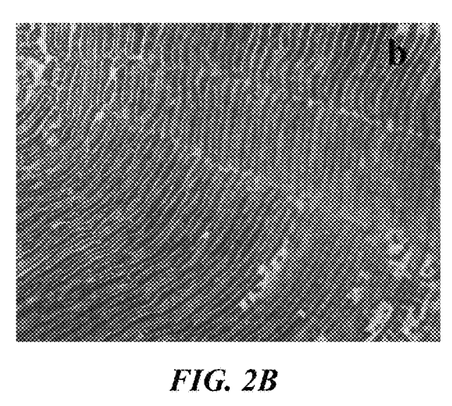
Figure 2C:
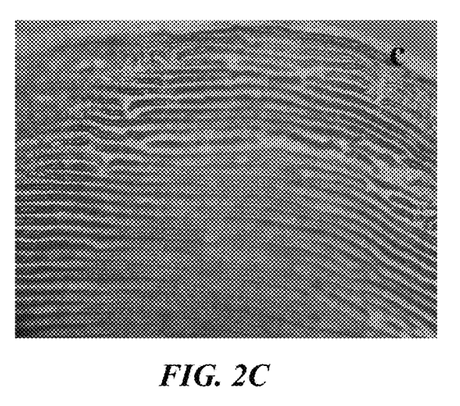
Figure 2D:
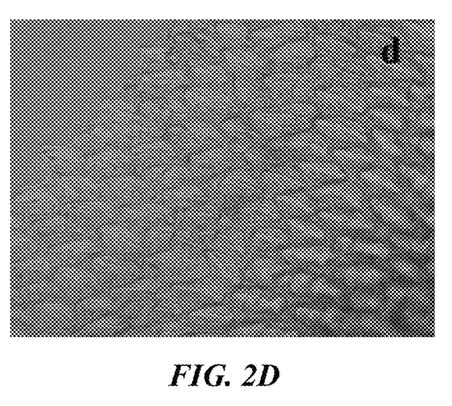

FIGS. 1A-1D and 2A-2D depict bright-field microscopic images of *Nemipterus japonicus* and *Lates calcarifer* fish scale, respectively. Based on the structural features, fish scales were classified into five types, including ganoid, ctenoid, cycloid cosmoid, and placoid. The *Nemipterus japonicas* (NJS) and *Lates calcarifer* (LCR) fish scales have a ctenoid pattern of structural architecture. The NJS and LCR fish scale structural architectures can be partitioned into four sections, such as a posterior field, an anterior field, and two lateral fields. The structural features of the LCR posterior region and the NJS posterior region were different. Sharp spine-like ctenii structures were observed in the NJS posterior region, while LCR have well-organized rice or seed-like ctenii architecture (FIGS. 1C and 2D). The lateral regions are covered by concentric ridges and grooves called circuli. An anterior region has primary and secondary radii. The radii are grooves that extend from the focus to the margin of scale (FIGS. 1A and 2B). The microscopic images clearly indicate that both types of fish scale have microgrooves and ridges in the micrometer scale. The focus area is located near the center of the fish scale and looks like a generally reticulate structure (FIGS. 1D and 2A). The micropatterned surface of the fish scales can provide enhanced cell alignment and adherence of cells. Thus, it was determined that the fish scales can be used as natural scaffolds for 3D cell culture applications.

Figure 3:
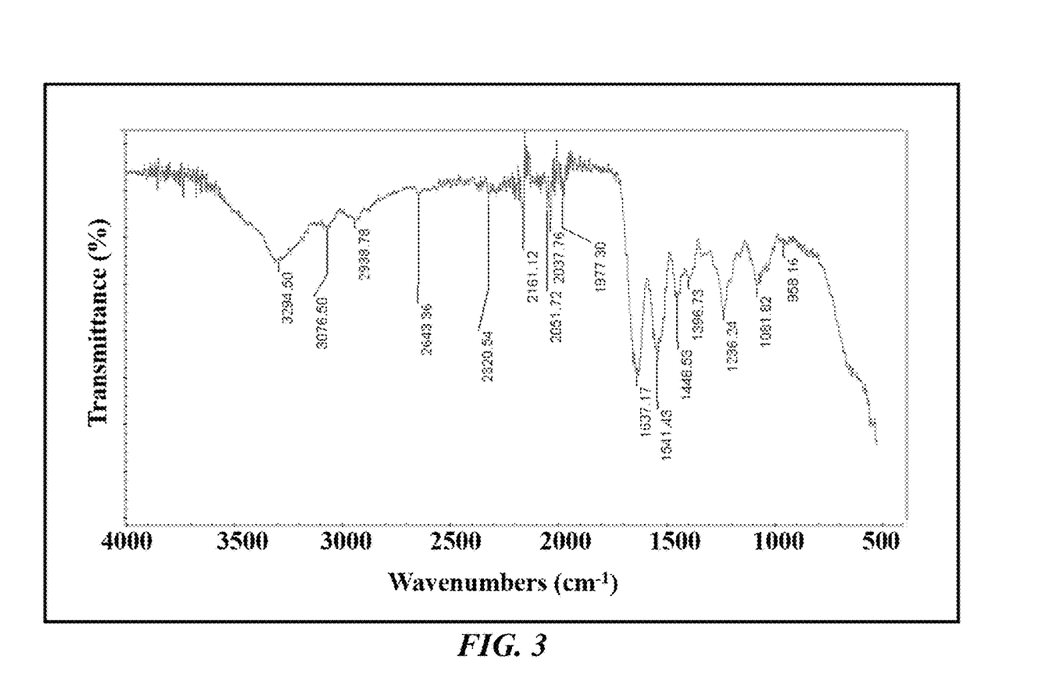
FIG. 3 shows FT-IR spectra of *Nemipterus japonicas* fish scale.
Figure 4:
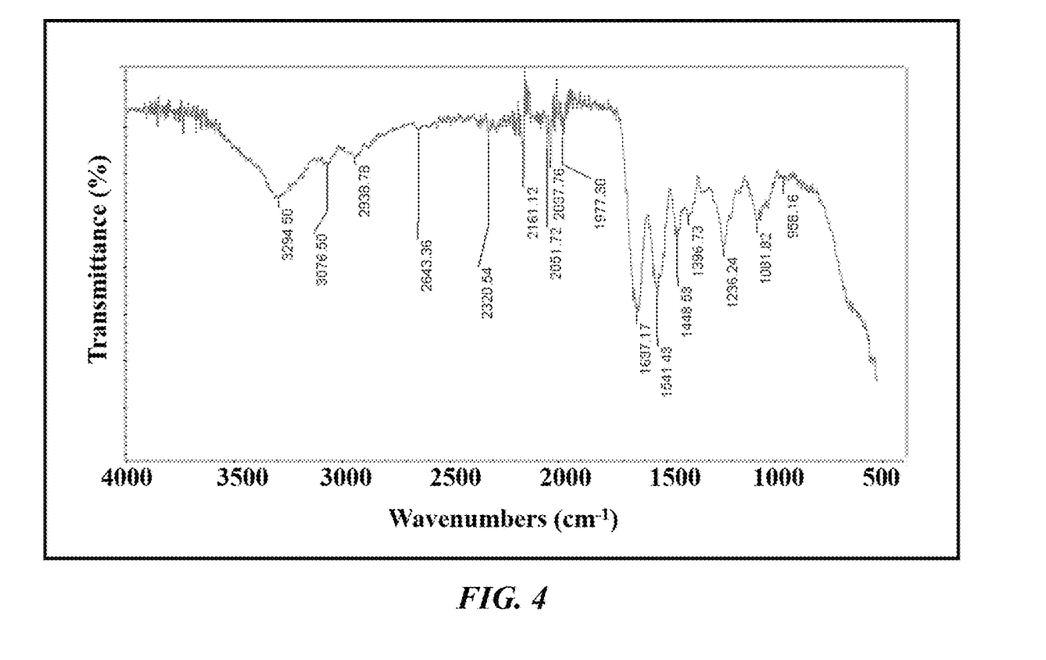
FIG. 4 shows FT-IR spectra of *Lates calcarifer* fish scale.

FIGS. 3 and 4 show FTIR spectra of NJS and LCR fish scale, respectively. The FTIR spectra of NJS and LCR show a broad absorption band between 3250 to 3450 $cm^{-1}$, which corresponds to stretching of the —OH group. The absorption peak around 2914 and 2938 $cm^{-1}$ were observed in NJS and LCR, respectively, which are responsible for CH stretching. Also, the absorption band between 1343-1448 $cm^{-1}$ are attributed to amide substituted alkyl groups. The amide I stretches were found at 1625 and 1637 $cm^{-1}$ in NJS and LCR fish scale, respectively. Additionally, the bands from 3000-2500 $cm^{-1}$ are attributed to carboxylic groups. The hydroxyapatite related $PO_4^{3-}$ symmetric stretching band was observed around 943 and 953 $cm^{-1}$ in NJS and LCR fish scale, respectively. In LCR, the band observed at 1081 $cm^{-1}$ was attributed to hydroxyapatite. Overall, FTIR spectra suggested that the fish scales included hydroxyapatite and collagen fibers.

Figure 5A:
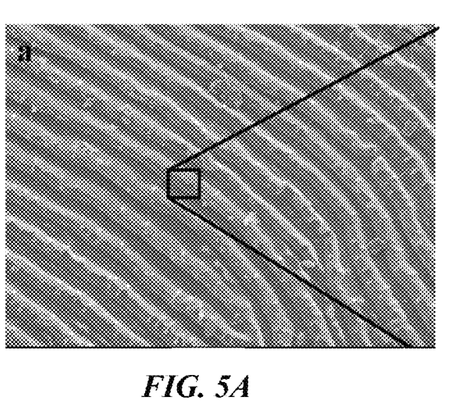
FIGS. 5A-5C show (5A-5B) scanning electron microscopic images and (5C) energy-dispersive X-ray spectra of *Nemipterus japonicas* fish scale.
Figure 5B:
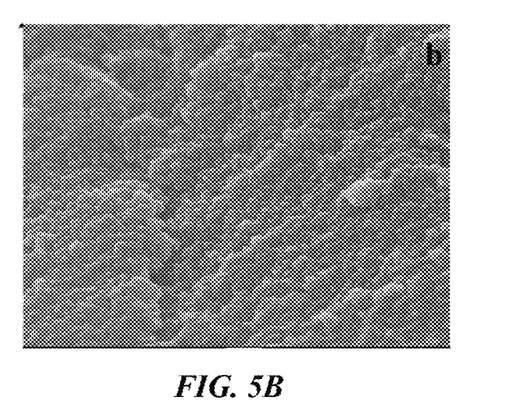
Figure 5C:
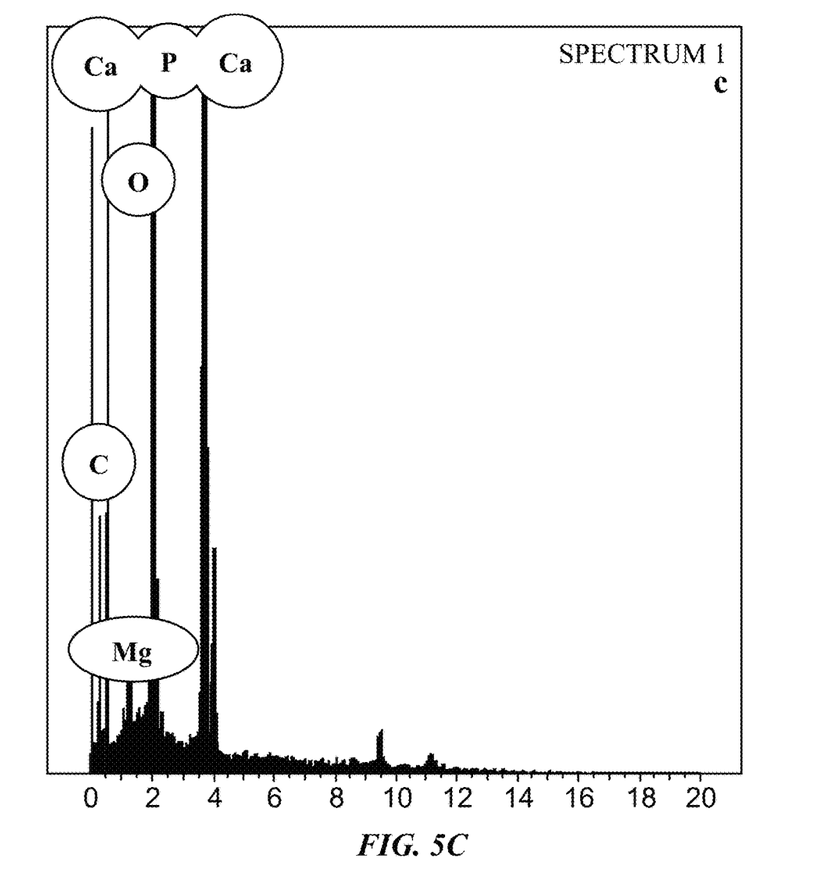
Figure 6A:
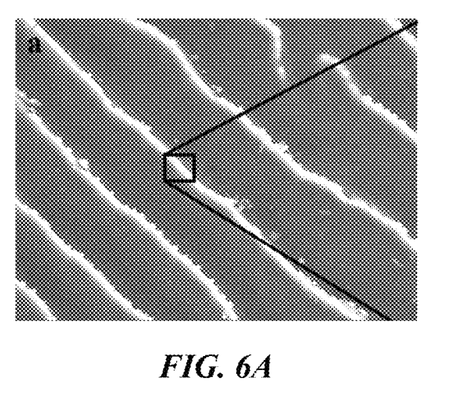
FIGS. 6A-6C show (6A-6B) scanning electron microscopic images and (6C) energy-dispersive X-ray spectra of *Lates calcarifer* fish scale.
Figure 6B:
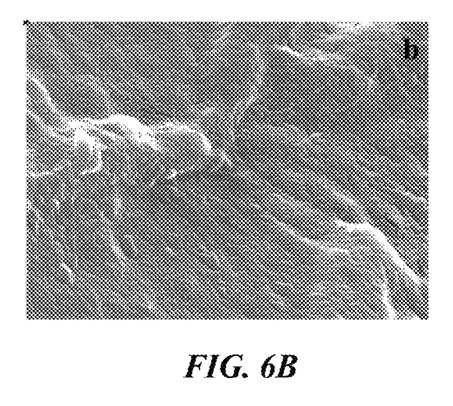
Figure 6C:
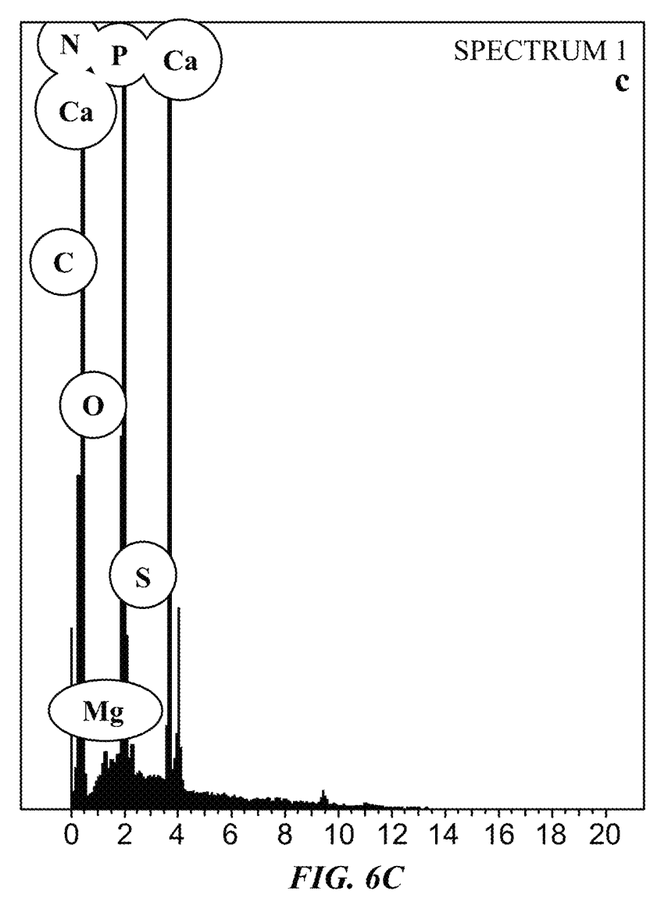
Figure 7:
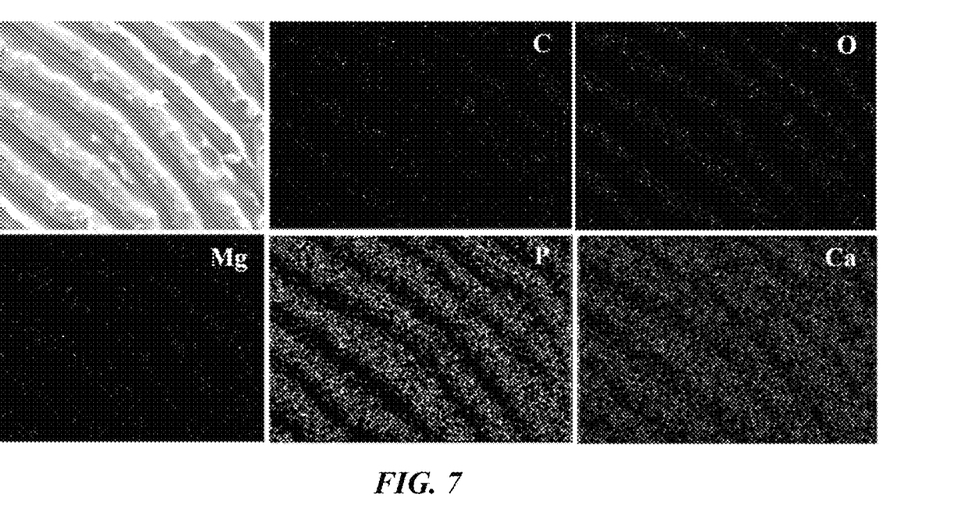
FIG. 7 shows elemental mapping of *Nemipterus japonicas* fish scale.
Figure 8:
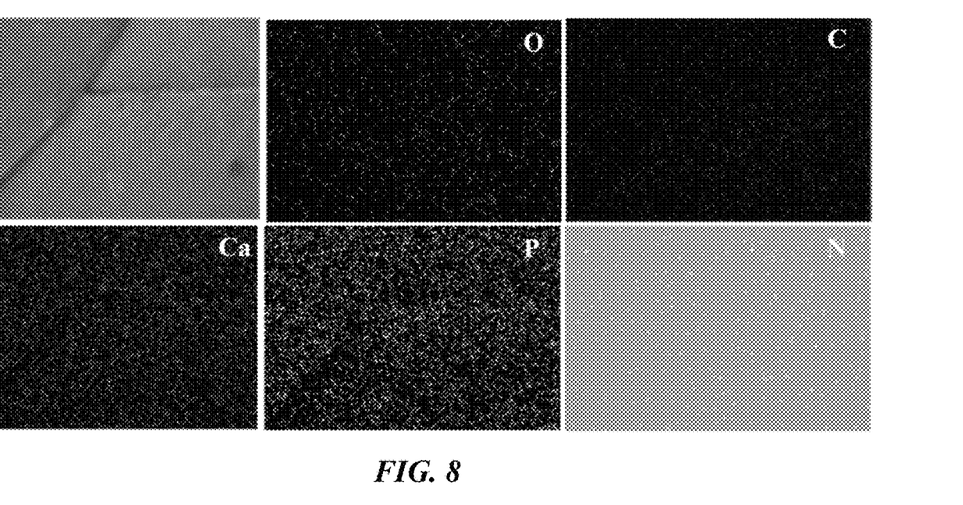
FIG. 8 shows elemental mapping of *Lates calcarifer* fish scale.

FIGS. 5 and 6 depict the scanning electron microscopic images and energy dispersive electron spectra of NJS and LCR fish scale, respectively. FIG. 5A shows the microgroove and ridges width as approximately 25-30 μM. FIG. 5B shows the SEM images of NJS fish scale at high magnification. This SEM image clearly indicates that NJS fish scale microgrooves and ridge microarchitecture was well organized by nanoscale particles. FIGS. 6A and 6B show LCR fish scale surface morphology that is identical to NJS fish scale. Elemental compositional analysis of fish scale was evaluated using Energy Dispersive X-ray analysis (EDX). FIGS. 5C and 6C show the elemental composition of NJS and LCR fish scale. These results showed that the fish scale was mainly composed of calcium, phosphate, carbon, and oxygen. The calcium, oxygen and phosphate correspond to hydroxyapatite. The carbon and oxygen relate to collagen and other organic substances. The NJS fish scale has a small quantity of Mg. LCR scales have a small quantity of Mg, S and N and the fish scale surface includes hydroxyapatite with an organic matrix. The microgrooves and ridges are organized by hydroxyapatite and collagen fibers. The mechanical strength of NJS and LCR fish scale is very good due to the organic-inorganic hybrid compositions. The structural features of NJS and LCR fish scale, chemical compositions and mechanical strength are highly suitable for scaffold fabrication for a 3-D cell culture.

Example 2

Scaffold Synthesis

Figure 9:
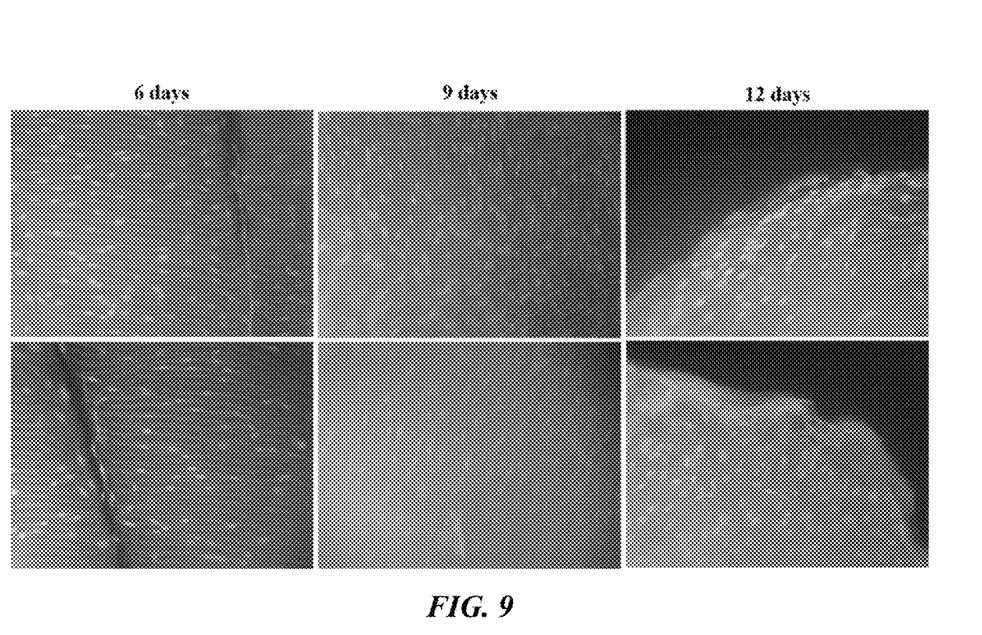
FIG. 9 shows fluorescent microscopic images of human mesenchymal cells on *Nemipterus japonicas* fish scale using AO/EB staining.
Figure 10:
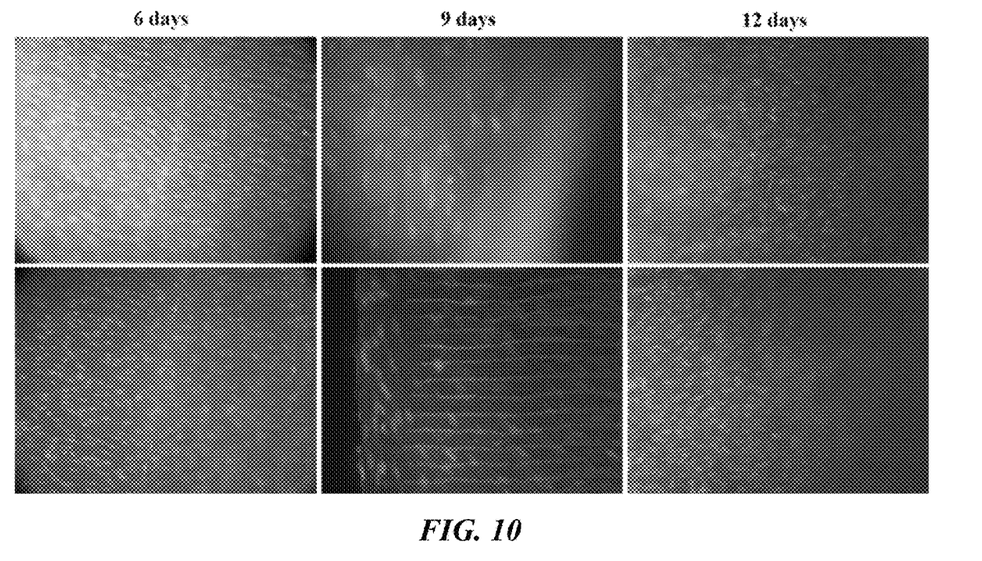
FIG. 10 shows fluorescent microscopic images of human mesenchymal cells on *Lates calcarifer* fish scale using AO/EB staining.

Human mesenchymal stem cells (hMSCs) were used as an in vitro model for 3-D cell culture. The hMSCs were seeded on the surface of NJS and LCR fish scale. The cells adhesion and proliferation of human mesenchymal stem cells on fish scale was investigated. The human mesenchymal stem cells are adherent cells. The cells were easily adhered on fish scale scaffolds due to their structural and chemical nature. The surface of both fish scales included microgrooves and ridges which favored improved cell attachment and proliferation on the surface of fish scales (FIGS. 9 and 10). Also, toxic effects were not observed by NJS and LCR fish scales on hMSCs. The acridine orange/ethidium bromide staining clearly suggested that human mesenchymal stem cells proliferated more with increased time. Also, the cells were grown in all directions, revealing that the hMSCs were grown in a three-dimensional pattern. When compared with LCR fish scale, NJS fish scale highly promotes cell adhesion and proliferation of hMSCs. Generally, the fish scales have a disc-like structure which is highly suitable for mammalian and animal cell growth on a solid support matrix in bioreactors. The results clearly suggest that fish scales are a non-toxic and biocompatible material, demonstrating enhanced hMSCs adhesion and proliferation over the surface. Thus, the fish scale can be a suitable extracellular matrix for large scale production of stem cells, vaccine production and tissue engineering applications.

It is to be understood that the method of preparing a three-dimensional scaffold for cell culture is not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of preparing a three-dimensional scaffold, consisting of:
   obtaining fish scales including a plurality of microgrooves and ridges, the plurality of microgrooves and ridges having a width ranging from about 25 μM to about 30 μM;
   sterilizing the fish scales under UV light or at a temperature of about 120° C. for about 15 minutes under pressurized conditions;
   contacting the sterilized fish scales with cell culture media; and
   seeding cells in the cell culture media;
   wherein the fish scales comprise at least one of *Nemipterus japonicas* (NJS) and *Lates calcarifer* (LCR) fish scales.

2. The method of claim 1, wherein the cell culture media comprises Dulbecco's Modified Eagle Medium (DMEM).

3. A method for in vitro cell growth, consisting of:
  providing fish scales including a plurality of microgrooves and ridges, the plurality of microgrooves and ridges having a width ranging from about 25 µM to about 30 µM;
  sterilizing the fish scales under UV light or at a temperature of about 120° C. for about 15 minutes under pressurized conditions;
  contacting the sterilized fish scales with cell culture media; and
  seeding cells in the cell culture media;
wherein the fish scales comprise at least one of *Nemipterus japonicas* (NJS) and *Lates calcarifer* (LCR) fish scales.

4. The method of claim 3, wherein the cell culture media comprises Dulbecco's Modified Eagle Medium (DMEM).

5. The method of claim 3, wherein the cells are human mesenchymal stem cells.

6. A method for in vitro cell growth, consisting of:
  obtaining fish scales from at least one of *Nemipterus japonicas* (NJS) and *Lates calcarifer* (LCR);
  sterilizing the fish scales at a temperature of about 120° C. for about 15 minutes under pressurized conditions;
  contacting the sterilized fish scales with Dulbecco's Modified Eagle Medium (DMEM); and
  seeding human mesenchymal stem cells in the cell culture media.

* * * * *